United States Patent Office 3,407,193
Patented Oct. 22, 1968

3,407,193
SUBSTITUTED BIURETS
John D. McColl, Dorval, Quebec, and Francis L. Chubb, Pierrefonds, Quebec, Canada, assignors to Frank W. Horner Limited, Mount Royal, Quebec, Canada
No Drawing. Filed Mar. 9, 1965, Ser. No. 438,419
12 Claims. (Cl. 260—239)

ABSTRACT OF THE DISCLOSURE

Compounds of the formula:

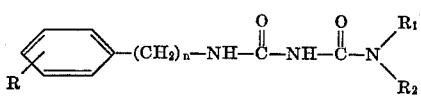

in which R is hydrogen, halogen or lower alkyl, $n$ is an integer having a value from 1 to 4, $R_1$ is hydrogen or lower alkyl, $R_2$ is alkyl or aralkyl, and $R_1$ and $R_2$ can be taken together with N to form a heterocyclic radical. Said compounds are useful as central nervous system depressants.

---

The present invention relates to novel organic compounds. More particularly, the invention relates to a class of substituted biurets having valuable pharmacological properties.

The compounds of the present invention can be represented by the following general formula:

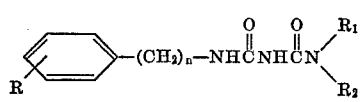

wherein R is selected from the group consisting of hydrogen, halogen and lower alkyl, $n$ is an integer having a value from 1 to 4, $R_1$ is selected from the group consisting of hydrogen and lower alkyl, $R_2$ is selected from the group consisting of aralkyl and alkyl, and wherein $R_1$ and $R_2$, when taken together with the attached nitrogen atom, can form a heterocyclic radical. As used herein and in the appended claims, the term 'lower alkyl' signifies an alkyl radical having from 1 to 6 carbon atoms.

The radical designated as $R_2$ in the above formula can be aralkyl or alkyl. When $R_2$ is aralkyl, such radical is preferably phenylalkyl wherein the alkyl radical contains from 1 to about 4 carbon atoms. When $R_2$ is alkyl, it is preferred that said radical contain from 1 to about 12 carbon atoms.

In those novel compounds of the invention wherein $R_1$ and $R_2$, when taken together with the attached nitrogen atom, form a heterocyclic radical wherein the nitrogen is part of the ring, it is preferred that said radical be monocyclic and contain from 4 to 7 ring atoms. Such heterocyclic ring can contain, in addition to the nitrogen, other hetero atoms, such as oxygen, sulfur and other nitrogen. Illustrative monoheterocyclic radicals include, for example, piperidino, morpholino, hexamethyleneimino, pyrrolidino, thiomorpholino, and piperazino.

The compounds of the invention can be classified, in general, as substituted biurets. However, those compounds wherein $R_1$ and $R_2$ are part of the same heterocyclic ring can be more correctly classified as N-allophanyl derivatives of the heterocyclic ring.

The novel compounds of the invention can be prepared by the reaction of an N-substituted nitrobiuret with an aralkylamine according to the following reaction scheme, wherein R, $R_1$, $R_2$ and $n$ are as hereinbefore defined:

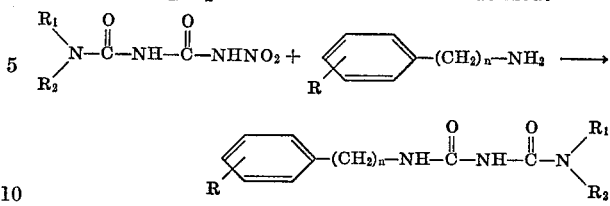

The above reaction is carried out in a liquid reaction medium, preferably water, at an elevated temperature, preferably in the range of from about 70° C. to about 100° C., and for a period of time sufficient to obtain the desired product, i.e., from about 20 to about 40 minutes.

An additional novel method for preparing the present compounds is disclosed and claimed in U.S. Ser. No. 438,389, by Francis L. Chubb, filed concurrently herewith now abandoned, and in its continuation-in-part application U.S. Ser. No. 554,676, filed June 2, 1966, now U.S. Patent No. 3,305,549, issued Feb. 21, 1967. Said method comprises reacting a suitably N-substituted allophanyl azide with an appropriate primary or secondary amine, preferably in an inert normally-liquid substantially non-polar organic medium, such as an aliphatic or aromatic hydrocarbon, according to one of the following reaction schemes, wherein R, $R_1$, $R_2$ and $n$ are as hereinbefore defined:

(I)

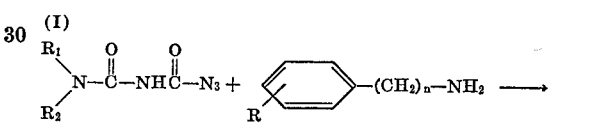

(II)

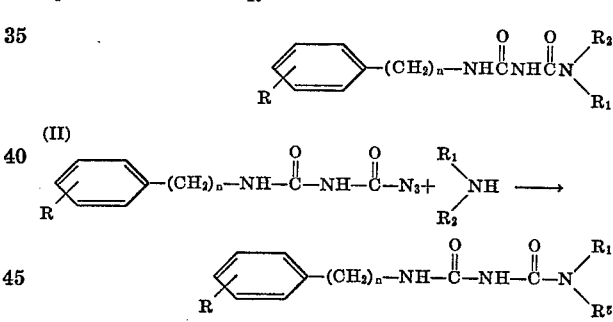

Illustrative compounds of the present invention which were prepared by one of the above-described procedures are set forth in Table I which follows:

TABLE 1

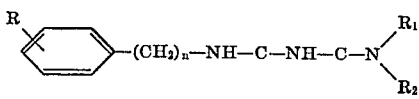

| Compound No. | R | n | $R_1$ | $R_2$ |
|---|---|---|---|---|
| 1 | H | 1 | H | n-Pr. |
| 2 | H | 1 | Et | Et. |
| 3 | H | 1 | n-Pr | n-Pr. |
| 4 | H | 2 | H | Me. |
| 5 | H | 2 | H | n-Pr. |
| 6 | H | 2 | H | n-Bu. |
| 7 | H | 2 | H | n-Oct. |
| 8 | H | 2 | Me | Me. |
| 9 | H | 2 | Et | Et. |
| 10 | p-Cl | 2 | Et | Et. |
| 11 | H | 2 | H | Bz. |
| 12 | H | 3 | Et | Et. |
| 13 | H | 3 | n-Pr | n-Pr. |
| 14 | H | 3 | H | γ-Phenylpropyl. |
| 15 | H | 4 | Et | Et. |
| 16 | H | 4 | n-Pr | n-Pr. |
| 17 | H | 2 | Morpholino | |
| 18 | H | 2 | Piperidino | |
| 19 | H | 2 | Hexamethyleneimino | |
| 20 | H | 2 | Pyrrolidino | |

The following examples illustrate the preparation of a representative number of the compounds of the present invention.

Example I.—Preparation of 1-(β-phenethyl)-5,5-diethylbiuret

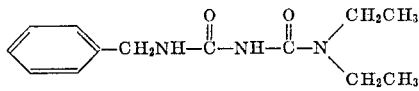

To a mixture of 55 ml. of concentrated sulfuric acid and 12 ml. of 70% nitric acid there was added in small portions 23 grams (0.13 mol) of 1,1-diethylbiuret. The reaction mixture was stirred vigorously and maintained at a temperature of from −5° to −10° C. during the addition. Stirring was continued for a period of 30 minutes after the addition was completed.

The reaction mixture was poured on ice and the resulting precipitate, consisting of 1,1-diethyl-5-nitrobiuret, M.P. 91°–92° C., collected by filtration.

The nitrobiuret and 16 grams (0.13 mol) of β-phenethylamine were added to 100 ml. of water and the resulting mixture heated on a steam bath for a period of 30 minutes. On cooling, a precipitate formed. Said precipitate was collected by filtration to give 29.5 grams of crude product, M.P. 70°–72° C.

Recrystallization from petroleum ether gave 14.0 grams of pure 1-(β-phenethyl)-5,5-diethylbiuret, M.P. 79°–80° C.

Example II.—Preparation of 1-(β-phenethyl)-5-n-butylbiuret

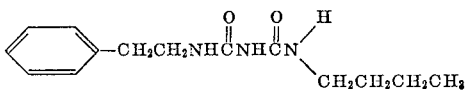

To a solution of 2.6 grams (0.022 mol) of β-phenethylamine in 150 ml. of benzene there was added 4.0 grams (0.022 mol) n-butylallophanyl azide. The mixture was stirred for about one hour at room temperature and then slowly heated to about 78° C. and maintained at said temperature for about one hour. Benzene was then removed from the resulting clear solution by evaporation, leaving 5.3 grams of crude material, M.P. 76°–89° C.

The crude material was recrystallized from ethanol-water to yield 2.75 grams of pure material, M.P. 91°–92° C. Additional material (1.45 grams, M.P. 90° C. and 0.5 gram, M.P. 89°–91° C.) was recovered from the recrystallization.

Analysis.—Calculated for $C_{14}H_{21}N_3O_2$: C, 63.86; H, 8.04; N, 15.96. Found: C, 63.65; H, 8.26; N, 15.93.

Example III.—Preparation of N-(4-β-phenethylallophanyl)morpholine

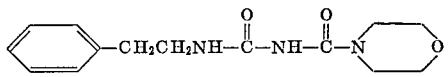

To a solution of 1.5 grams (0.017 mol) of morpholine in 150 ml. of benzene there was added 4.0 grams (0.017 mol) of β-phenethylallophanyl azide. After the mixture was stirred for about one hour at room temperature it was slowly heated to about 79° C. and maintained at said temperature for about 30 minutes. The solvent was then removed by evaporation and the residue (4.4 grams) was recrystallized from methanol to yield 3.1 grams, M.P. 135°–136° C., and 0.5 gram, M.P. 128°–130° C., of N-(4-β-phenethylallophanyl)morpholine.

Analysis.—Calculated for $C_4H_{19}N_4O_3$: C, 60.63; H, 6.91; N, 15.15. Found: C, 60.77; H, 6.87; N, 15.13.

The compounds of the present invention have valuable pharmacodynamic properties in warm-blooded animals as central nervous system depressants, in particular, as muscle relaxant and anticonvulsant agents.

The relaxant action of the present compounds was determined by their ability to induce the loss of righting reflex in rats and mice. In this test, the compound under consideration is injected intraperitoneally as a 2% suspension in 1% Tween 80. The test animals were male mice, RR strain, weighing from 18 to 30 grams and male rats, RR-Wistar strain, weighing from 150 to 250 grams.

The dose of the test compound which caused 50 percent of the test animals to lose their righting reflex, as evidenced by the animals' inability to right themselves when placed on their backs, is expressed as the mean hypnotic dose ($HD_{50}$). The mean acute toxicity of the compound under consideration is expressed as the dose thereof which will cause the death of 50 percent of the test animals 72 hours after injection ($PD_{50}$). The $HD_{50}$ and $PD_{50}$ values are expressed in milligrams of active ingredient per kilogram of test animal body weight.

Table II, which follows, sets forth the activity and the acute toxicity of a representative number of compounds of the invention.

TABLE II

| Compound No. | $HD_{50}$ (mice) | $HD_{50}$ (rats) | $LD_{50}$ (mice) |
|---|---|---|---|
| 3 | 215 | 225 | 1,420 |
| 4 | 200 | 148 | 740 |
| 6 | 245 | 190 | 860 |
| 9 | 195 | 205 | 800 |
| 12 | 161 | 113 | 700 |
| 13 | 410 | 500 | 1,150 |
| 14 | 190 | 150 | 610 |
| 15 | 315 | 125 | 1,000 |
| 18 | 406 | 400 | 1,210 |

Table III, which follows, shows the duration of sleep or loss of righting reflex in mice and rats receiving nonlethal doses of the test compounds. Sleeping time was determined by observing the onset of sleep, i.e., when the animals remained on their back when placed in that position, and the time of return of the righting reflex, i.e., when the animals spontaneously righted themselves.

TABLE III

| Compound No. | Dose (mg./kg.) | Mean Sleeping Time (minutes) |
|---|---|---|
| Mice: | | |
| 3 | 800 | >226 |
| 4 | 500 | >86 |
| 6 | 500 | 72 |
| 9 | 500 | >340 |
| 12 | 500 | 245 |
| 13 | 800 | >284 |
| 14 | 500 | >237 |
| 15 | 400 | 91 |
| 18 | 500 | 33 |
| Rat: | | |
| 3 | 200 | 89 |
| 4 | 300 | 125 |
| 6 | 500 | 280 |
| 9 | 300 | 190 |
| 12 | 200 | 147 |
| 13 | 500 | 12 |
| 14 | 300 | >257 |
| 15 | 200 | 57 |
| 18 | 400 | 44 |

From the above results, it is apparent that the compounds of the present invention possess unique depressant activity, as evidenced by their ability to induce loss of righting reflex in mice and rats for substantial periods of time. In addition, the present compounds are non-toxic in amounts producing effective depressant action on the central nervous system.

Additional usefulness of the present compounds is contributed by their anticonvulsant activity. For example, 1-(β-phenethyl)-5-n-butylbiuret (Compound 6) effectively antagonized to a high degree convulsions induced by pentylenetetrazole in mice. Similarly, 1-(γ-phenylpropyl)-5,5-dipropylbiuret (Compound 13) and 1-(δ-phenylbutyl)-5,5-diethylbiuret (Compound 15) showed a high degree of anticonvulsant activity.

The active compounds of the present invention can be pharmaceutically administered to a warm-blooded animal as pure compounds. However, it is preferred to incorporate said active ingredients in a suitable pharmaceutical carrier.

The preferred mode of administration is by oral route, with the active ingredient in the form of tablets or capsules. Suitable solid pharmaceutical carriers useful in the preparation of such tablets or capsules include, for example, starch, lactose, sucrose, glucose, gelatin, and the like.

The active ingredients can also be dissolved in a liquid pharmaceutical carrier such as, for example, propylene glycol, ethylene glycol, glycerol, or mixtures thereof, to form a solution suitable for administration by intramuscular injection or for oral administration.

Unit dosage forms, such as tablets, capsules or injectable solutions, can contain any suitable predetermined amount of active ingredient and may be administered as desired. An effective single dose of the active ingredient is generally in the range of from about 25 to about 1000 mg.

What is claimed is:
1. A compound of the formula:

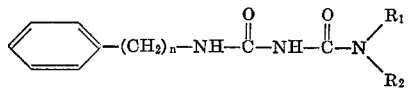

where $n$ is an integer having a value from 1 to 4 and $R_1$ and $R_2$, taken together with N, form a monoheterocyclic radical selected from the group consisting of piperidino, morpholino, hexamethyleneimino, pyrrolidino, thiomorpholino, and piperazino.

2. As a novel compound, 1-benzyl-5,5-dipropylbiuret.
3. As a novel compound, 1-($\beta$-phenethyl)-5-(n-butyl)biuret.
4. As a novel compound, 1-($\beta$-phenethyl)-5,5-diethylbiuret.
5. As a novel compound, 1-($\gamma$-phenylpropyl)-5,5-diethylbiuret.
6. As a novel compound, 1-($\gamma$-phenylpropyl)-5,5-dipropylbiuret.
7. As a novel compound, 1,5-di($\gamma$-phenylpropyl)-biuret.
8. As a novel compound, 1-($\delta$-phenylbutyl)-5,5-diethylbiuret.
9. As a novel compound 4 - [4 - ($\beta$ - phenethyl) - allophanyl]morpholine.
10. As a novel compound, 1-[4-($\beta$-phenethyl)-allophanyl]piperidine.
11. As a novel compound, 1-[4-($\beta$-phenethyl)-allophanyl]hexamethyleneimine.
12. As a novel compound, 1-[4-($\beta$-phenethyl)-allophanyl]piperidine.

References Cited
UNITED STATES PATENTS
3,253,902  5/1966  Munz et al. _____ 260—247.2

OTHER REFERENCES
McColl et al.: J. Med. Chem., vol 6, pp. 584–7 (1963).
Murray et al.: Chem. Abstracts, vol. 28, p. 1665 (1943).

ALTON D. ROLLINS, *Primary Examiner.*